United States Patent Office 3,444,100
Patented May 13, 1969

3,444,100
RADIATION RESISTANT SEMICONDUCTOR GRADE SILICON CONTAINING A METAL OXIDE
Simon Ernest Mayer, Lexington, Mass., assignor to Trancoa Chemical Corporation, Reading, Mass., a corporation of Massachusetts
No Drawing. Filed Oct. 30, 1963, Ser. No. 319,998
Int. Cl. B01j *17/40*
U.S. Cl. 252—520                                        4 Claims The present invention relates to semiconductive materials and more particularly to semiconductive silicon materials whose electrical properties are not substantially affected by irradiation.

Single crystal silicon semiconductive materials are commonly used in such devices as solar cells, diodes, transistors and the like which may be subject to particle irradiation in such applications as the missile field. It is known that upon irradiation by protons, neutrons, gammas and electrons such single crystal silicon semiconductive material undergoes changes in structure which in turn gives rise to changes in electrical properties of the material and particularly lifetime properties and resistivity. Such changes can upset entire electrical systems with consequent loss of time and money.

In efforts to overcome the problems generated by irradiation, prior workers have incorporated heavy metals and/or oxygen in semiconductive silicon materials. However these expedients have not proven to be a complete solution to the problem. For example, when oxygen is added to the silicon a damage level is introduced into the energy gap in the energy diagram of the silicon. This damage level is about the same as caused by irradiation of the silicon. Therefore upon further irradiation comparatively little change in resistivity occurs. However, it has not proven possible to introduce enough oxygen into silicon to adequately stabilize the silicon at the desired level, apparently because the decomposition pressure of silicon prevents a sufficient amount of oxygen from remaining in molten silicon.

It is an important object of this invention to provide semiconductive single crystal silicon material which is highly resistant to particle irradiation and substantially retains its electrical properties after such irradiation.

It is another important object of this invention to provide a silicon material in accordance with the preceding object which can be made by substantially conventional procedure with minimized expense.

According to the invention, single crystal semiconductor grade silicon is treated by incorporating electrically neutral oxides in the silicon. Preferably the oxides used are metallic oxides of metals in Group IV of the Periodic Chart. Surprisingly the incorporation of such oxides in silicon substantially prevents changes in resistivity and lifetime of the silicon upon irradiation. The Group IV metal oxides used should have equilibrium decomposition pressures lower than the equilibrium decomposition pressure of silicon dioxide which is $10^{-15}$ millimeters of oxygen at 1426° C.

Oxides of titanium, zirconium and niobium are preferred because of their low decomposition pressures in molten silicon. The decomposition pressure of each of the preferred oxides is listed below:

Titanium dioxide—$10^{-16}$ mm. of $O_2$ at 1426° C.
Zirconium dioxide—approximately $10^{-17}$ mm. of $O_2$ at 1426° C.
Niobium dioxdie—approximately $10^{-17}$ mm. of $O_2$ at 1426° C.

These oxides are preferably soluble in the single crystal silicon lattice and are used in amounts of from 0.005 to 0.1% by weight of the silicon. A preferred range is from 0.01 to 0.04% by weight of the silicon with 0.025% by weight of the silicon giving outstanding results. It is important that the oxide used be highly purified in the range of 99.999% purity and above. Otherwise minor amounts of impurities may themselves change the electrical properties of the single crystal silicon material. The oxides normally have a particle size in the micron range, although other sizes may be used.

The silicon material is preferably semiconductor grade single crystal silicon grown from a melt according to conventional procedures such as the Czochralski technique. P or N type silicon may be treated in accordance with this invention. P type silicon me be formed by doping the melt with from 1 to 100 parts per billion of an element selected from Group III of the periodic chart including indium, gallium, aluminum and other similar elements. N type silicon may be formed by doping the melt with an element selected from Group V of the periodic chart including antimony, arsenic, phosphorus and other similar elements.

Preferably the oxide material of this invention is added to the melt and uniformly incorporated therein prior to pulling of the single crystal silicon.

In a specific example of this invention 200 grams of semiconductor grade silicon are melted in a 200 cubic certimeter crucible. 20 milligrams of N type silicon containing 1 part in 10,000 phosphorus are added to the melt to yield a concentration of approximately 100 parts per billion of phosphorus. 25 milligrams of ultrapure titanium dioxide (purity at least 99.9999%) are added to the melt which is maintained at 1426° C. A 100 gram crystal of single crystal semiconductive silicon is pulled from the melt by inserting a silicon seed crystal and using the Czochralski technique. The resultant crystal has a resistivity of 1 ohm-cm. The crystal is treated with a radiation dose of $2 \times 10^{16}$ electrons/cm.$^3$ with an insubstantial resultant change in resistivity from 1 ohm-cm. to 5 ohm-cm.

Single crystal silicon prepared as above described without the addition of titanium dioxide was also exposed to an identical radiation dosage of $2 \times 10^{16}$ electron/cm.$^3$. In this sample resistivity changed from 1 ohm-cm. to 15 ohm-cm.

The above example clearly illustrates the fact that the addition of ultrapure titanium dioxide to single crystal silicon does not substantially affect the resulting resistivity and that such material shows only an insignificant change in resistivity upon exposure to irradiation while identical material not containing titanium dioxide changes significantly in its resistivity value upon irradiation. These materials are particularly useful for use in semiconductor devices such as transistors, diodes, solar cells and the like.

It is believed that irradiation changes the structure of the crystal lattice formed by single crystal silicon tending to displace a certain proportion of the atoms in the lattice and rearrange the interstices with resultant change in resistivity. The Group IV metal oxides do not ionize in silicon and in some way stabilize the lattice against rearrangement upon exposure to irradiation.

It is evident that those skilled in the art may now make numerous modifications of and departures from the specific embodiment of the invention described herein without departing from the inventive concept. For example, other crystal forming techniques or zone refining may be used to form the material of this invention. The particular radiation resistant additive to the silicon may vary so long as it is electrically neutral and has a decomposition pressure at 1426° C. below that of silicon dioxide. Therefore the breadth of this invention is to be construed as limited only by the spirit and scope of the appended claims.

What is claimed is:

1. A radiation resistant single crystal, semiconductor grade silicon material having uniformly incorporated therein a radiation resistant material consisting essentially of titanium dioxide in amounts of from 0.005% to 0.1% by weight of silicon material.

2. A silicon material in accordance with claim 1 wherein said titanium dioxide is present in amounts of from 0.01 to 0.04% by weight of said silicon.

3. A radiation resistant single crystal, semiconductor grade silicon material having uniformly incorporated therein from 0.005 to 0.1% by weight of zirconium dioxide.

4. A radiation resistant single crystal, semiconductor grade silicon material having uniformly incorporated therein from 0.005 to 0.1% by weight of niobium dioxide.

References Cited

UNITED STATES PATENTS 2,871,330   1/1959   Collins _____ 338—15

LEON D. ROSDOL, *Primary Examiner.*

J. D. WELSH, *Assistant Examiner.*

U.S. Cl. X.R.

148—1.5; 252—62.3, 512